(12) United States Patent
Webb

(10) Patent No.: US 9,284,809 B2
(45) Date of Patent: Mar. 15, 2016

(54) APPARATUS AND METHOD FOR CONNECTING FLUID LINES

(71) Applicant: Cameron International Corporation, Houston, TX (US)

(72) Inventor: Ronald W. Webb, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/594,032

(22) Filed: Jan. 9, 2015

(65) Prior Publication Data

US 2015/0129235 A1 May 14, 2015

Related U.S. Application Data

(63) Continuation of application No. 13/159,712, filed on Jun. 14, 2011, now Pat. No. 8,960,310.

(51) Int. Cl.
| | | |
|---|---|---|
| *E21B 34/14* | (2006.01) | |
| *E21B 34/10* | (2006.01) | |
| *E21B 33/038* | (2006.01) | |
| *E21B 33/064* | (2006.01) | |
| *E21B 17/02* | (2006.01) | |

(Continued)

(52) U.S. Cl.
CPC .............. *E21B 33/038* (2013.01); *E21B 17/02* (2013.01); *E21B 33/064* (2013.01); *E21B 34/14* (2013.01); *F16L 37/33* (2013.01); *F16L 39/00* (2013.01); *Y10T 137/7837* (2015.04)

(58) Field of Classification Search
CPC ............................. E21B 33/064; E21B 17/02
USPC ................ 166/339, 344, 351, 360, 368, 373, 166/332.1; 137/614.02–614.05; 251/149.1, 251/149.6, 149.7

See application file for complete search history.

(56) References Cited

U.S. PATENT DOCUMENTS

| | | | | |
|---|---|---|---|---|
| 1,362,552 A | * | 12/1920 | Alexander | F04F 1/18 166/54 |
| 1,377,762 A | * | 5/1921 | Duhon | F04B 47/00 137/516.11 |
| 1,961,602 A | * | 6/1934 | Squires | F04F 1/18 166/372 |

(Continued)

FOREIGN PATENT DOCUMENTS

JP   2000-130675 A   5/2000

OTHER PUBLICATIONS

PCT International Search Report and Written Opinion dated Feb. 1, 2013, for PCT/US2012/041356 filed on Jun. 7, 2012. (10 pages).

*Primary Examiner* — Matthew R Buck
*Assistant Examiner* — Edwin Toledo-Duran
(74) *Attorney, Agent, or Firm* — Chamberlain Hrdlicka

(57) ABSTRACT

An apparatus and method for controlling fluid flow in a blow-out preventer. In one embodiment, an apparatus for connecting fluid lines includes a socket fluid connector and a plug fluid connector. Each connector includes a flow channel. The plug fluid connector is detachably connectable to the socket fluid connector at a connection end of the plug and socket fluid connectors such that the flow channels align. Each of the socket and plug fluid connectors includes a check valve in the flow channel. The check valve is configured to prevent fluid flow through the connector flow channels while the plug and socket fluid connectors are not connected, and to enable bidirectional fluid flow through the connector flow channels while plug and socket fluid connectors are connected.

10 Claims, 6 Drawing Sheets

(51) Int. Cl.
*F16L 37/33* (2006.01)
*F16L 39/00* (2006.01)

(56) References Cited

U.S. PATENT DOCUMENTS

| | | | | |
|---|---|---|---|---|
| 2,133,383 A * | 10/1938 | Erwin | E21B 37/08 | 166/102 |
| 2,233,013 A * | 2/1941 | Humason | E21B 33/12 | 166/102 |
| 2,284,154 A * | 5/1942 | Lampton | B64C 11/34 | 416/36 |
| 2,338,903 A * | 1/1944 | Coberly | F04B 47/04 | 166/68.5 |
| 2,509,444 A * | 5/1950 | Mitchell | F16L 37/252 | 137/614.04 |
| 2,518,299 A * | 8/1950 | Fernandez | F25B 41/003 | 137/15.09 |
| 2,522,444 A * | 9/1950 | Grable | E21B 21/01 | 166/81.1 |
| 2,864,628 A * | 12/1958 | Edleson | F16L 37/107 | 137/614.04 |
| 2,926,934 A * | 3/1960 | Gill | F16L 37/23 | 137/614.04 |
| 3,025,702 A * | 3/1962 | Merrill | B66C 13/04 | 251/122 |
| 3,347,311 A * | 10/1967 | Word, Jr | E21B 33/035 | 166/305.1 |
| 3,348,575 A * | 10/1967 | Simak | F16L 37/23 | 137/614.05 |
| 3,456,728 A * | 7/1969 | Chenoweth | E21B 43/123 | 137/501 |
| 3,538,950 A * | 11/1970 | Porteners | F16L 37/407 | 137/879 |
| 3,554,277 A * | 1/1971 | Bauer | E21B 33/035 | 166/338 |
| 3,695,349 A * | 10/1972 | Murman | E21B 33/064 | 166/352 |
| 3,710,860 A * | 1/1973 | Holbert, Jr. | E21B 34/02 | 137/495 |
| 3,788,348 A * | 1/1974 | Johnson | F16L 37/23 | 137/542 |
| 3,837,575 A * | 9/1974 | Lehnert | B05B 7/1209 | 239/112 |
| 3,854,663 A * | 12/1974 | Goldsberry | G05D 21/00 | 137/468 |
| 4,023,718 A * | 5/1977 | Forbriger | B05B 7/32 | 137/322 |
| 4,249,572 A * | 2/1981 | Shindelar | F16L 37/23 | 137/596.1 |
| 4,387,767 A * | 6/1983 | Read | E21B 33/122 | 166/120 |
| 4,527,587 A * | 7/1985 | Fairlamb | F16L 29/02 | 137/329.3 |
| 4,532,995 A * | 8/1985 | Kaufman | E21B 21/10 | 166/327 |
| 4,596,272 A * | 6/1986 | Medvick | F16L 37/133 | 137/614.03 |
| 4,612,953 A * | 9/1986 | Caroll | B25B 27/0028 | 137/327 |
| 4,637,432 A * | 1/1987 | Medvick | F16L 37/133 | 137/614.03 |
| 4,694,859 A * | 9/1987 | Smith, III | E21B 33/038 | 137/614.04 |
| 4,754,780 A * | 7/1988 | Smith, III | F16L 37/35 | 137/614.04 |
| 4,825,897 A * | 5/1989 | Shade | F16K 17/24 | 137/271 |
| 4,827,977 A * | 5/1989 | Fink, Jr. | F16L 55/1015 | 137/614.04 |
| 4,832,080 A * | 5/1989 | Smith, III | F16L 1/26 | 137/614.04 |
| 4,911,203 A * | 3/1990 | Garms | F16L 37/096 | 137/614.04 |
| 4,936,544 A * | 6/1990 | Bartholomew | F16L 37/0987 | 251/149.6 |
| 5,099,882 A * | 3/1992 | Smith, III | E21B 33/038 | 137/614 |
| 5,105,543 A * | 4/1992 | Maarschalk | B25B 7/126 | 30/135 |
| 5,131,429 A * | 7/1992 | Nixon | F16L 37/407 | 137/329.3 |
| 5,203,374 A * | 4/1993 | Smith, III | E21B 33/038 | 137/614.04 |
| 5,228,474 A * | 7/1993 | Nimberger | F16L 37/084 | 137/614.04 |
| 5,257,653 A * | 11/1993 | Nimberger | F16L 37/32 | 137/498 |
| 5,365,973 A * | 11/1994 | Fink, Jr. | F16L 55/1015 | 137/614.04 |
| 5,379,798 A * | 1/1995 | Syljeset | F16L 37/30 | 137/614.01 |
| 5,390,702 A * | 2/1995 | Smith, III | F16L 1/26 | 137/614.04 |
| 5,398,761 A | 3/1995 | Reynolds et al. | | |
| 5,699,822 A * | 12/1997 | Bodhaine | F16L 29/00 | 137/614.04 |
| 5,772,116 A * | 6/1998 | Holt | B05B 7/02 | 239/124 |
| 5,791,366 A * | 8/1998 | Lo | F16L 55/1007 | 137/614.04 |
| 5,810,047 A * | 9/1998 | Kirkman | F16L 17/035 | 137/614.01 |
| 5,823,438 A * | 10/1998 | Holt | B05B 7/02 | 239/127 |
| 6,024,124 A * | 2/2000 | Braun | F16L 37/0841 | 137/614.03 |
| 6,123,104 A * | 9/2000 | Smith, III | F16L 29/04 | 137/614.04 |
| 6,135,150 A * | 10/2000 | Powell | F16L 29/04 | 137/614.03 |
| 6,237,631 B1 * | 5/2001 | Giesler | F16K 31/0689 | 137/614.04 |
| 6,354,564 B1 * | 3/2002 | Van Scyoc | F16L 37/32 | 137/614.04 |
| 6,564,829 B2 * | 5/2003 | Arisato | F16L 29/04 | 137/545 |
| 6,572,029 B1 * | 6/2003 | Holt | B05B 7/02 | 239/124 |
| 6,626,207 B1 * | 9/2003 | Smith, III | F16L 37/32 | 137/614.03 |
| 7,096,937 B2 * | 8/2006 | Bartlett | B24B 37/04 | 166/86.2 |
| 7,165,619 B2 * | 1/2007 | Fox | E21B 7/124 | 166/343 |
| 7,275,563 B2 * | 10/2007 | Tiberghien | F16L 29/04 | 137/614.04 |
| 7,575,023 B2 * | 8/2009 | Fraser | F16K 17/40 | 137/614.04 |
| 7,617,874 B2 * | 11/2009 | Ocalan | E21B 43/123 | 166/319 |
| 8,281,866 B2 * | 10/2012 | Tessier | E21B 34/08 | 116/319 |
| 2005/0217845 A1 | 10/2005 | McGuire | | |
| 2009/0038805 A1 * | 2/2009 | Parks | E21B 33/0355 | 166/341 |
| 2009/0048028 A1 * | 2/2009 | Ostergaard | E21B 33/038 | 464/20 |
| 2009/0233150 A1 * | 9/2009 | Takahashi | H01M 8/04216 | 429/457 |
| 2010/0024907 A1 * | 2/2010 | Tibbitts | E21B 33/038 | 137/614.04 |
| 2010/0229981 A1 * | 9/2010 | June | E21B 33/038 | 137/614.02 |
| 2013/0276923 A1 * | 10/2013 | Wolff | F16L 37/004 | 137/614.02 |

* cited by examiner

APPARATUS AND METHOD FOR CONNECTING FLUID LINES

BACKGROUND

Blowout preventers (BOPs) are used in hydrocarbon drilling and production operations as a safety device that closes, isolates, and seals the wellbore. Blowout preventers are essentially large valves connected to the wellhead and comprise closure members that seal and close the well to prevent the release of high-pressure gas or liquids from the well. One type of blowout preventer used extensively in both low and high-pressure applications is a ram-type blowout preventer. A ram-type blowout preventer uses two opposed closure members, or rams, disposed within a specially designed housing, or body. The blowout preventer body has a bore aligned with the wellbore. Opposed cavities intersect the bore and support the rams as they move into and out of the bore. A bonnet is connected to the body on the outer end of each cavity and supports an operator system that provides the force required to move the rams into and out of the bore.

Ram-type blowout preventers are often operated using pressurized hydraulic fluid to control the position of the closure members relative to the bore. The flow of hydraulic fluid to the rams is controlled via one or more control pods of the blowout preventer. The control pod provides an electrical interface for operation of the blowout preventer from a drilling platform or other surface location. The control pod may be modularized to facilitate pod testing and service by allowing individual replacement and/or testing of each module. The control pod generally includes an electronics package (MUX module) and a hydraulics module (MOD module). The MUX module provides electrical communication with surface systems and electrically activated solenoid valves. The solenoid valves control flow of hydraulic fluid to hydraulic pilot valves of the MOD module.

The MUX and MOD modules are coupled by a number of hydraulic connectors through which pressurized fluid flows between the modules.

SUMMARY

An apparatus and method for controlling fluid flow in a blowout preventer. In one embodiment, an apparatus for connecting fluid lines includes a socket fluid connector and a plug fluid connector. Each connector includes a flow channel. The plug fluid connector is detachably connectable to the socket fluid connector at a connection end of the plug and socket fluid connectors such that the flow channels align. Each of the socket and plug fluid connectors includes a check valve in the flow channel. The check valve prevents fluid flow through the connector flow channels while the plug and socket fluid connectors are not connected, and enables bidirectional fluid flow through the connector flow channels while plug and socket fluid connectors are connected.

In another embodiment, a subsea control unit for controlling a subsea device includes a hydraulic module and an electrical control module. The hydraulic module provides hydraulic pressure to the subsea device (e.g., a subsea blowout preventer). The hydraulic module includes a plurality of fluid connectors. The electrical control module electrically controls fluid delivery to the hydraulic module. The electrical control module includes a plurality of fluid connectors, each of which corresponds to and is mateable with one of the fluid connectors of the hydraulic module. Each of the fluid connectors comprises a check valve that prevents fluid flow through the connector while the connectors are not mated, and allows bidirectional fluid flow through the connector while the connectors are mated.

In yet another embodiment, a drilling system for boring earthen formations includes a blowout preventer disposed at a subsea wellhead. The blowout preventer includes a subsea control pod that hydraulically controls the blowout preventer. The control pod includes a mated pair of hydraulic connectors that connect fluid lines of the control pod. At least one of the connectors includes a stem that enables bidirectional fluid flow through the mated connectors by forcing a check valve in each connector open while the connectors are mated.

In a further embodiment, a fluid connector assembly includes a socket fluid connector and a plug fluid connector. Each connector includes a flow channel. The plug fluid connector is releasably connectable to the socket fluid connector at a connection end of the plug and socket fluid connectors wherein the flow channels are coaxially aligned. Each of the socket and plug fluid connectors includes a check valve in the flow channel. The check valve includes a closing seat and a moving member. The moving member has a closed position sealingly engaging the closing seat when the socket and plug connectors are not connected, and an open position spaced apart from the closing seat when the socket and plug fluid connectors are connected. At least one of the socket and plug fluid connectors includes a stem that engages the moving members of both the socket and plug fluid connectors when the moving members are in the open position.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The electronics section (MUX module) and the hydraulics section (MOD module) of a blowout preventer control pod are hydraulically connected by a plurality of fluid connectors of each module. When the connectors of the modules are engaged, fluid is allowed to flow bidirectionally between the modules through the connectors. In a conventional system, when the connectors are disengaged while the fluid system is pressurized, the expulsion of fluid through the connectors can present a safety hazard.

Embodiments of the present disclosure include a fluid connector that inhibits expulsion of fluid when connectors are disengaged. The connector includes a valve that is mechanically and positively held open when a pair of connectors is engaged, allowing bidirectional hydraulic flow through the connectors. When the connectors are disengaged, the valve closes automatically, preventing expulsion of fluid from the connectors and the attendant safety hazard.

Figure 1:
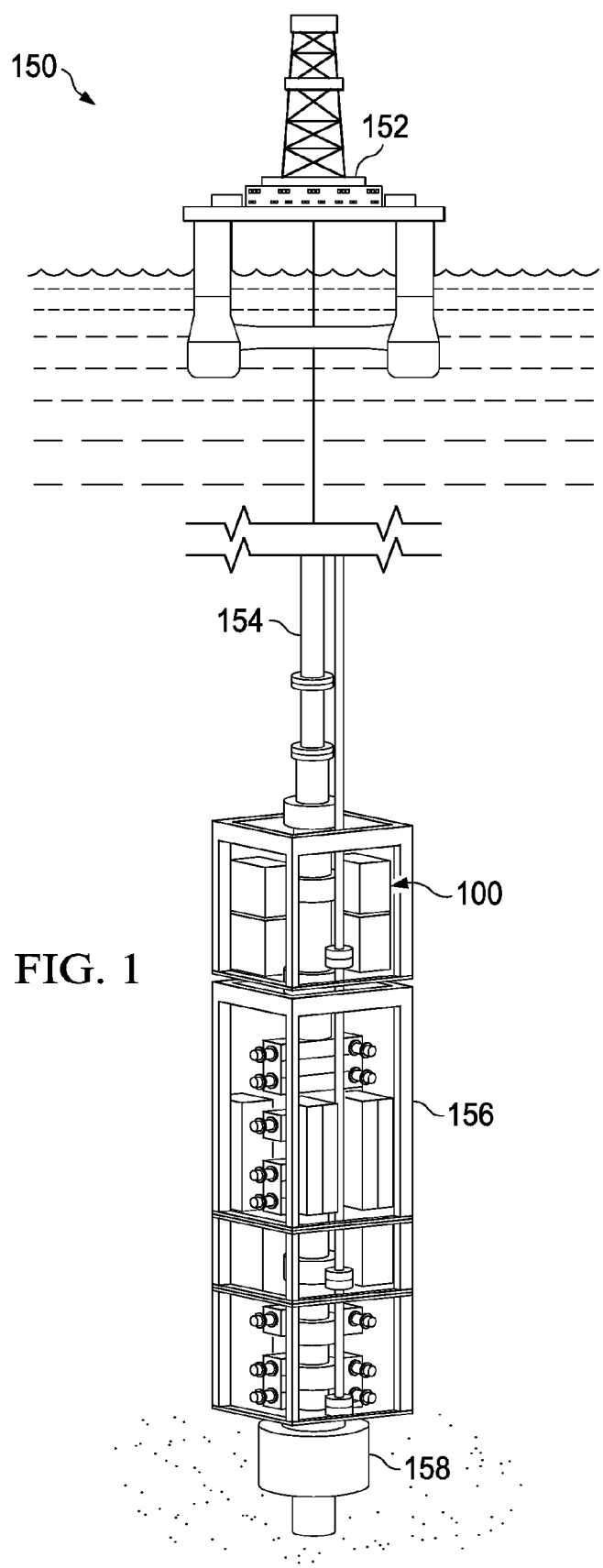
FIG. 1 shows drilling system including a blowout preventer in accordance with various embodiments.

FIG. 1 shows drilling system 150 in accordance with various embodiments. The drilling system 150 includes a drilling platform and drilling rig 152, a riser 154, and a blowout preventer (BOP) 156. The BOP 156 is coupled to a wellhead 158. The riser 154 connects the BOP 156 to the drilling platform 152. One or more control pods 100 are coupled to the BOP 156 for actuating BOP hydraulics in response to control signals provided from the surface.

Figure 2:
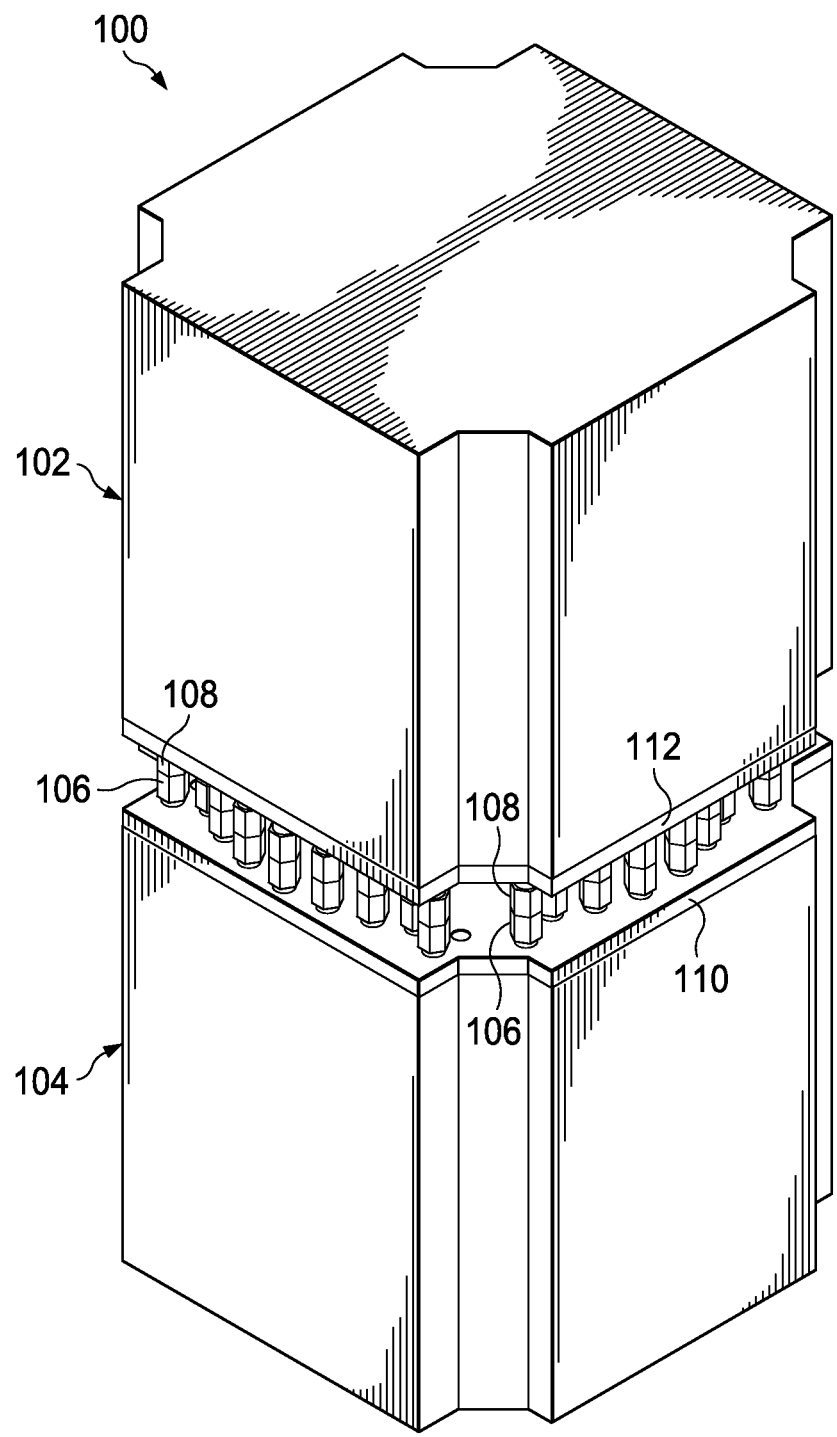
FIG. 2 shows a blowout preventer control pod in accordance with various embodiments.

FIG. 2 shows the BOP control pod 100 in accordance with various embodiments. The control pod 100 includes a MUX module 102 and a MOD module 104. The MUX module 102 and the MOD module 104 are hydraulically connectable through fluid connectors 106, 108 mounted in a connector panel 110, 112 of each of the MUX and MOD modules 102, 104. Each of the fluid connectors 106, 108 includes a check valve that prevents fluid expulsion from the connectors 106, 108 while the connectors 106, 108 are disengaged, and allows bidirectional fluid flow while the connectors 106, 108 are engaged.

Figure 3:
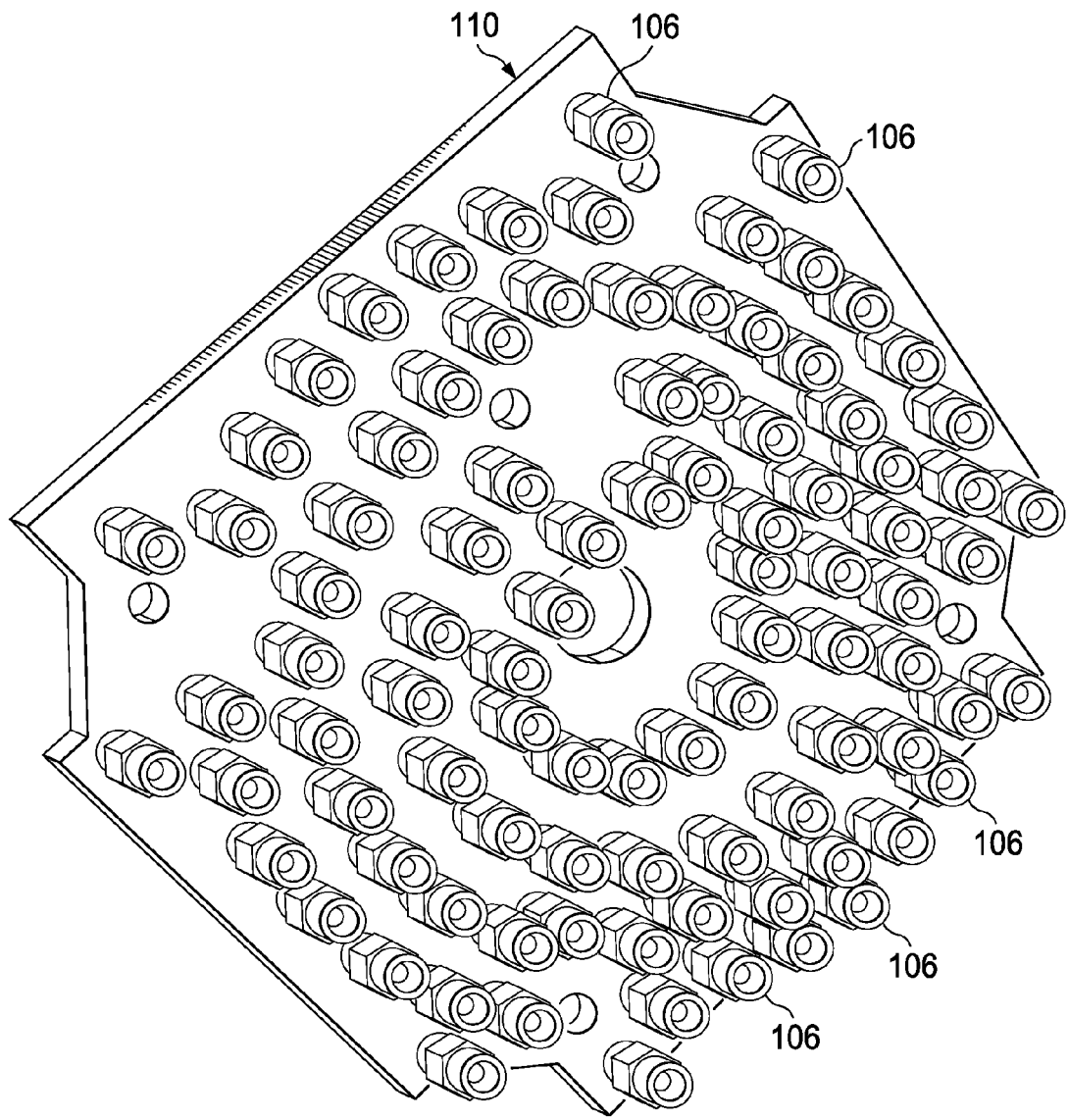
FIG. 3 shows a fluid connector panel of a module of a control pod in accordance with various embodiments.

FIG. 3 shows a fluid connector panel 110 of module 102 of the control pod 100 in accordance with various embodiments. The connector panel 112 of the module 104 is similarly configured. The connector panel 110 includes a plurality of connectors 106 and/or connectors 108 for transferring hydraulic fluid between the module 102 and the module 104.

Figure 4:
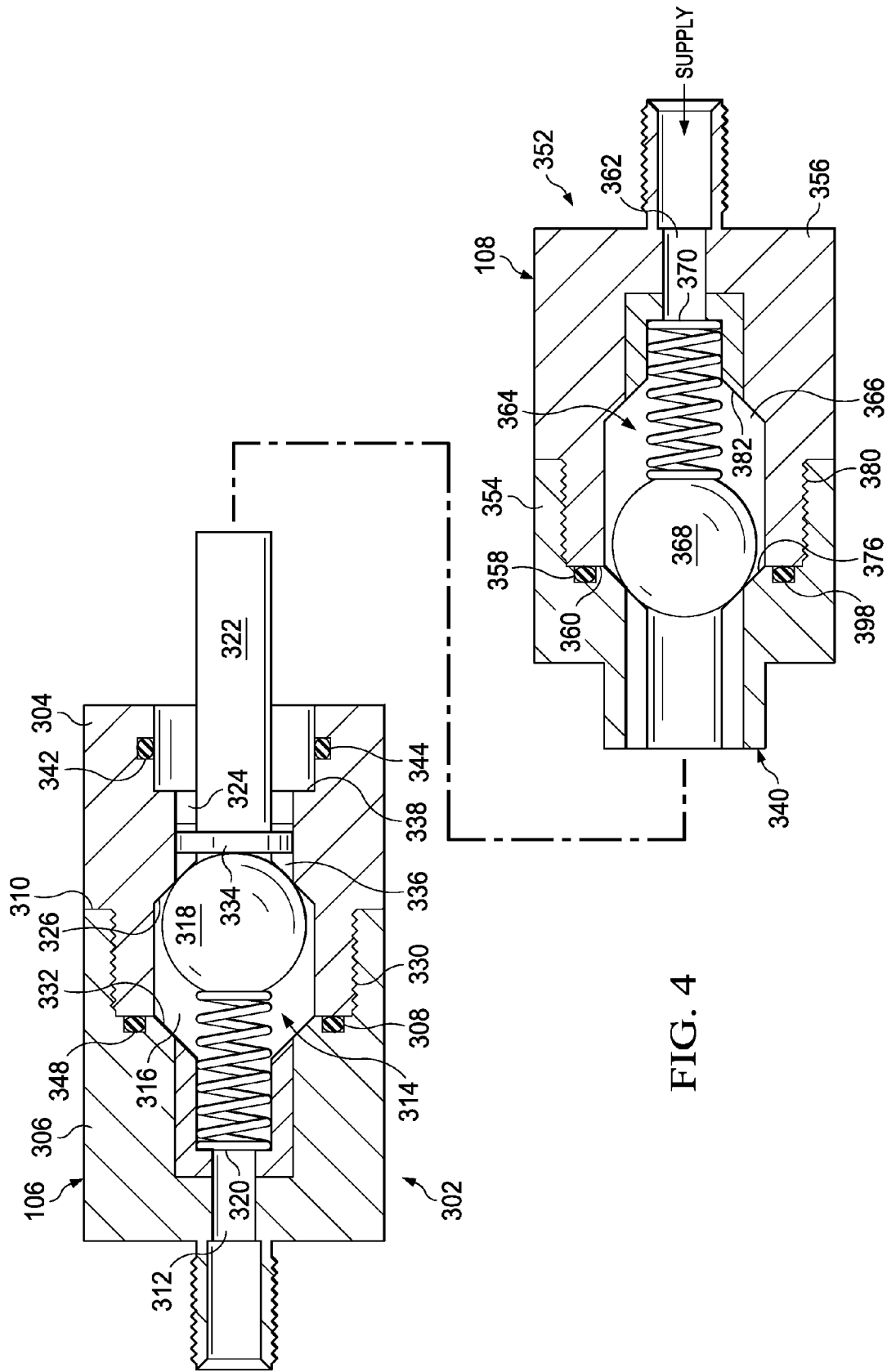
FIG. 4 shows a mateable pair of fluid connectors in accordance with various embodiments.

FIG. 4 shows a view of a longitudinal cross section of a mateable pair of fluid connectors 106, 108 in accordance with various embodiments. As shown in FIG. 3, the connector 106 may be a socket connector, and the connector 108 may be a plug connector. In FIG. 4 the valves of the connectors 106, 108 are illustrated in the closed position, whereby fluid is prevented from flowing out of the connectors 106, 108. The generally cylindrical body 302 of the connector 106 includes a mating section 304 that mates with the connector 108, and a line connection section 306 that is connectable to a fluid line. The sections 304, 306 are joined, e.g., threaded together via threads 330, to form the body 302. A groove 308 in one of the sections 304, 306 contains a sealing device 348 (e.g., an O ring, a gasket, etc.) that seals the interface 310 between the sections 304, 306. The body 302 of fluid connector 106 includes a passage 312 though which fluid flows through the connector 106.

A portion of the passage 312 is configured to form a check valve 314. The check value 314 comprises an expanded diameter region 316 of the passage 312 that retains a moving member 318 (i.e., a closing member), an elastic member 320 (e.g., a coil spring), and a stem 322. The moving member 318 is a flow blocking member that operates to prevent fluid flow out of connector 106, and may be spherical, poppet-shaped, or any shape suitable for use in a check valve in various embodiments. A first end of the expanded diameter region 316 forms a closing valve seat 326. A second end of the expanded diameter region 316 forms an opening valve seat 332. In FIG. 4 the moving member 318 is positioned against the closing valve seat 326 sealing the connector 106 and preventing fluid from flowing out of the mating end of the connector 106. Expansion of the elastic member 320 provides the sealing force that moves the moving member 318 into contact with the closing valve seat 326.

The stem 322 is in contact with the moving member 318 and is disposed forward of the closing valve seat 326 (i.e., towards the mating end of the connector 106) when the check valve 314 is closed as shown in FIG. 4. In some embodiments, the stem 322 may be a part of or fixed to the moving member 318. In other embodiments, the stem 322 may be in contact with but not fixed to the moving member 318. The stem 322 forces the valves of connectors 106, 108 open while the connectors 106, 108 are engaged. The base of the stem 322 includes a flange 334. In some embodiments of the check valve 314, the flange 334 engages the moving member 318 and is dimensioned to fit within a flange holding area 336 proximate to the closing valve seat 326.

A socket 338 of the connector 106 is configured to receive a plug 340 of the connector 108 when the connectors 106, 108 are mated. A groove 342 in the socket 338 retains a sealing device 344 that prevents fluid from escaping past the sealing device 344 to ambient space while the connectors 106, 108 are mated and under operating or test pressure.

The body 352 of the connector 108 also includes a mating section 354 and a line connection section 356. The sections 354, 356 are joined, e.g., threaded together via threads 380, to form the body 352. A groove 358 in one of the sections 354, 356 contains a sealing device 398 (e.g., an 0 ring, a gasket, etc.) that seals the interface 360 between the between the sections 354, 356. The body 352 of fluid connector 108 includes a passage 362, though which fluid flows through the connector 108.

A portion of the passage 362 is configured to form a check valve 364. The check value 364 comprises an expanded diameter region 366 of the central passage 362 that retains a moving member 368 (i.e., a closing member), and an elastic member 370 (e.g., a coil spring). A first end of the expanded diameter regions 366 forms a closing valve seat 376. A second end of the expanded diameter region forms an opening valve seat 382. In FIG. 4, the moving member 368 is positioned against the closing valve seat 376, sealing the connector 108. Expansion of the elastic member 370 provides the sealing force that moves the moving member 368 into contact with the closing valve seat 376.

While the connector 108 lacks a stem 322, as illustrated, in some embodiments of the connectors 106, 108, the stem 322 may be disposed in and retained by the connector 108 rather than the connector 106. In other embodiments, both of the connectors 106, 108 may include stems 322.

Figure 5:
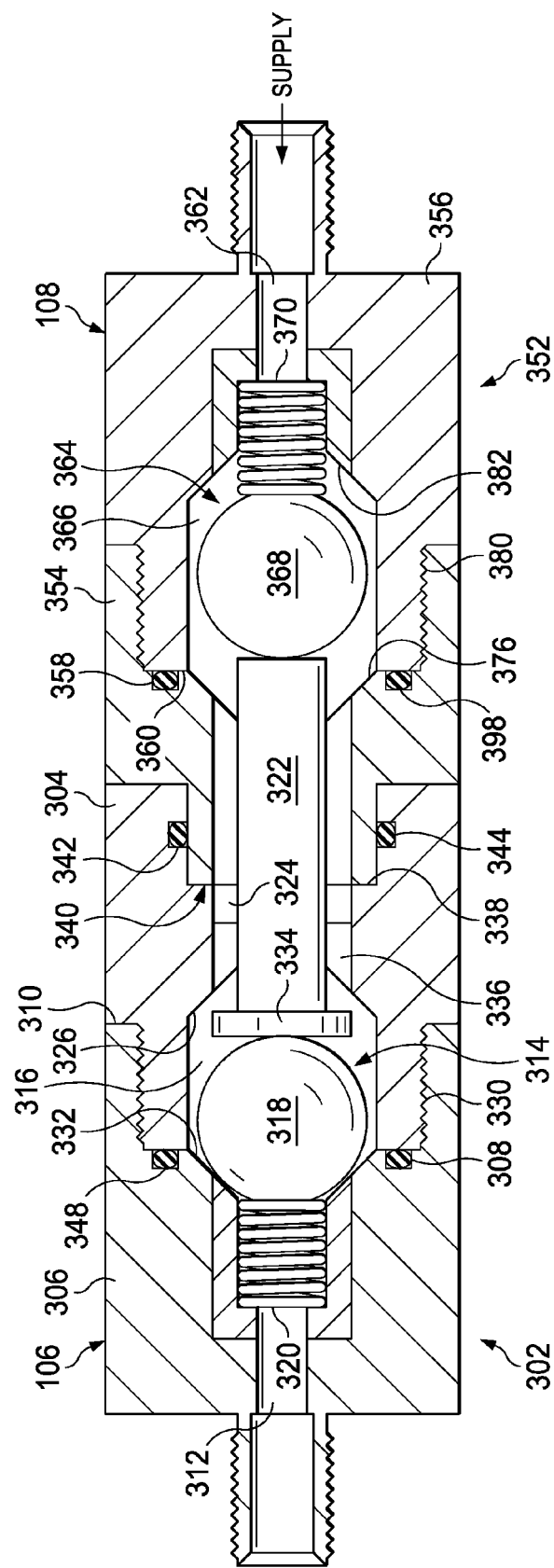
FIG. 5 shows a mated pair of fluid connectors in accordance with various embodiments.

FIG. 5 shows a mated pair of fluid connectors 106, 108 in accordance with various embodiments. The plug 340 of the connector 108 is within the socket 338 of the connector 106, and the stem 322 of the connector 106 is in contact with the moving member 368 of the connector 108 and the moving member 318 of the connector 106. The force of the stem 322 against the moving members 318, 368 pushes the moving members 318, 368 away from the corresponding closing valve seats 326, 376. The length of the stem 322 ensures that both of the moving members 318, 368 disengage from the forward valve seats 326, 376 when the connectors 106, 108 are mated. Thus, the stem 322 holds both check valves 314, 364 open when the connectors 106, 108 are engaged, thereby allowing full bidirectional flow between the connectors 106, 108 through the passages 312, 362.

In some embodiments, the check valves 314, 364 are configured to position one of the moving members 318, 368 against a corresponding opening valve seat 332, 382 when the connectors 106, 108 are mated. In FIG. 5, the moving member 318 is positioned against the opening valve seat 332 of the connector 106. The opening valve seat 332, 382 may include ridges running in the direction of the connector 106, 108 longitudinal axis. The ridges allow fluid to flow freely past the opening valve seat 332, 382 and the moving member 318, 368 while the moving member 318, 368 is disposed against the opening valve seat 332, 382. In some embodiments, the relative forces of the elastic members 320, 370 may determine which of the moving members 318, 368 contacts the opening seat 332, 382. In other embodiments, the length of the expanded region 316 may differ from the length of the expanded region 366 causing the moving member 318, 368 disposed in the shorter of the expanded regions 316, 366 to contact the corresponding opening valve seat 332, 382 while the connectors 106, 108 are mated.

The stem retaining and guide structure 324 may also include ridges or passages that allow fluid to flow into and/or out of the connector 106.

Various components of the connectors 106, 108, including the sections 304, 306, 354, 356, the moving members 318, 368, and the stem 322 may be made of stainless steel or any other material suitable for use in a fluid connector of a blowout preventer control pod 100.

Figure 6:
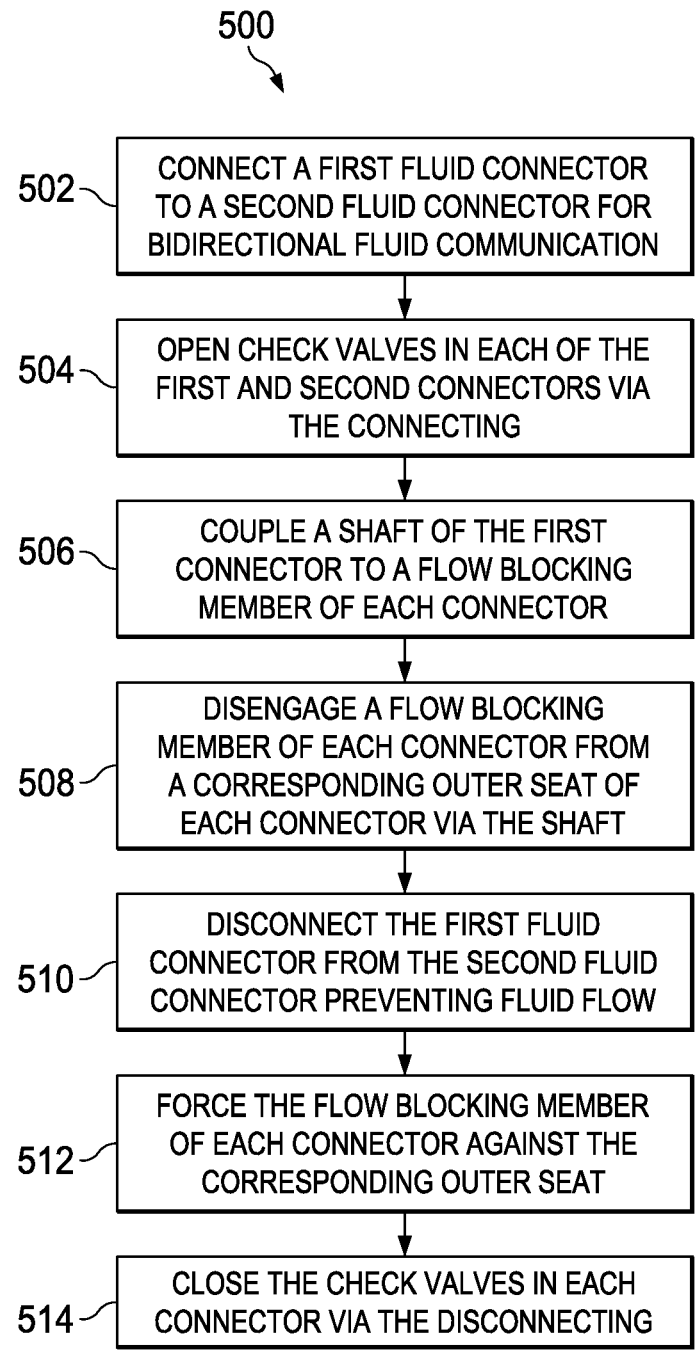
FIG. 6 shows a flow diagram for a method for controlling fluid flow in a connector pair in accordance with various embodiments.

FIG. 6 shows a flow diagram for a method for controlling fluid flow in a connector pair 106, 108 in accordance with various embodiments. Though depicted sequentially as a matter of convenience, at least some of the operations shown can be performed in a different order and/or performed in parallel. Additionally, in some embodiments of the method 500, only some of the operations shown may be performed.

In block 502, the socket fluid connector 106 is brought into engagement with the plug fluid connector 108 to allow bidirectional fluid communication between the connectors 106, 108.

In block 504, as the connectors 106, 108 are connected, a check valve 314 in the first connector 106, and a check valve 364 in the second connector 108 are opened. The check valves 314, 364 are opened by mechanical engagement of the connectors 106, 108 rather than by force of fluid.

To effect opening of the check valves 314, 364, in block 506, a shaft 322 extending from the socket connector 106 is coupled to a flow blocking member 318 of the socket connector 106 and to a flow blocking member 368 of the plug connector 108.

In block 508, the flow blocking member 318 of the socket connector 106 and the flow blocking member 368 of the plug connector 108 are disengaged from corresponding closing valve seats 326, 376 of the socket and plug connectors 106, 108 by force of the shaft 322. The length of shaft 322 ensures that neither blocking member 318, 368 remains in contact with the corresponding closing valve seat 326, 376 while the connectors 108, 108 are connected. In some embodiments, at least one of the blocking members 318, 368 is forced against an opening valve seat 332 by the shaft 322.

In block 510, the socket connector 106 is disconnected from the plug connector 108. The disconnection prevents fluid communication between the socket connector 106 and the plug connector 108, and prevents fluid flow out of the mating end of each of the socket and plug connectors 106, 108.

In block 512, as the connectors 106, 108 are unmated, the shaft 322 of the socket connector 106 disengages from the flow blocking member 368 of the plug connector 108. As the force of the shaft 322 is removed, the flow blocking member 318 of the socket connector 106 and the flow blocking member 368 of the plug connector 108 are each forced against the corresponding outer seat 326, 376 of the first and second connectors 106, 108 by force of the elastic members 320, 370 on the blocking members 318, 368.

In block 514, the connectors 106, 108 are disconnected. The check valve 314 in the first connector 106 and the check valve 364 in the second connector 108 are closed.

The above discussion is meant to be illustrative of the principles and various embodiments of the present invention. Numerous variations and modifications will become apparent to those skilled in the art once the above disclosure is fully appreciated. For example, while embodiments of the fluid connectors 106, 108 are described with regard to the blowout preventer control pod 100, those skilled in the art will understand that various embodiments of the connectors 106, 108 are applicable to other apparatus requiring fluid connectors incorporating valves that are mechanically opened and allow bidirectional fluid flow while the connectors are mated, and prevent fluid flow out of the connectors while unmated. It is intended that the following claims be interpreted to embrace all such variations and modifications.

What is claimed is:

1. An apparatus for connecting fluid lines, comprising:
   a socket fluid connector comprising a flow channel; and
   a plug fluid connector comprising a flow channel, the plug fluid connector detachably connectable to the socket fluid connector such that the flow channels are alignable when connected;
   wherein each of the socket and plug fluid connectors comprises a check valve in the flow channels, each check valve comprising a moving member configured to prevent fluid flow through the connector flow channels while the fluid connectors are not connected; and
   wherein at least one of the fluid connectors further comprises a stem unconnected to each moving member and configured to engage each moving member when the fluid connectors are connected to enable bidirectional flow around the stem and through the flow channels.

2. The apparatus of claim 1, wherein the check valve of each fluid connector comprises:
   a closing seat; and
   a spring disposed against the moving member and configured to force the moving member against the closing seat while the fluid connectors are not connected, thereby preventing fluid flow through the fluid connectors.

3. The apparatus of claim 2, wherein the check valve of each connector comprises an expanded region of the flow channel, the expanded region containing the moving member; wherein the expanded regions of the connectors differ in length.

4. The apparatus of claim 2, wherein the stem is configured to force the moving member of each of the fluid connectors off of the corresponding closing seat while the connectors are connected.

5. The apparatus of claim 4, wherein the length of the stem exceeds the distance between the closing seats of the fluid connecters when the plug and socket fluid connectors are connected.

6. The apparatus of claim 1, wherein each of the fluid connectors comprises a cylindrical body comprising a first section forming a mating end and a second section forming a fluid line connection end, and wherein the sections are threadingly engaged to retain the moving member.

7. A subsea control unit, comprising:
   a hydraulic module configured to provide hydraulic pressure to a subsea device, the hydraulic module comprising fluid connectors; and
   an electrical control module configured to electrically control fluid delivery to the hydraulic module, the electrical control module comprising fluid connectors, each of which corresponds to and is mateable with one of the hydraulic module fluid connectors;
   wherein each of the fluid connectors comprises a check valve comprising a moving member configured to prevent fluid flow through the connector flow channels while the fluid connectors are not connected; and
   wherein at least one of the fluid connectors further comprises a stem unconnected to each moving member and configured to engage each moving member when the fluid connectors are connected to enable bidirectional flow around the stem and through the connector flow channels of the fluid connectors.

8. The subsea control unit of claim 7, wherein each check valve comprises:
   a closing seat; and
   a spring disposed against the moving member and configured to force the moving member against the closing seat while the fluid connectors are not connected, thereby preventing fluid flow through the fluid connectors.

9. The subsea control unit of claim 8, wherein the stem is configured to extend across a mating connection of the fluid connectors to cause each moving member to recede from the corresponding closing seat while the connectors are connected.

10. The subsea control unit of claim 7, wherein the subsea control unit is coupled to a blowout preventer configured to seal a wellbore, the subsea control unit configured to control operation of the blowout preventer.

\* \* \* \* \*